United States Patent
Medina et al.

(10) Patent No.: US 12,062,063 B1
(45) Date of Patent: Aug. 13, 2024

(54) SYSTEM FOR A PRODUCT BUNDLE INCLUDING DIGITAL PROMOTION REDEEMABLE TOWARD THE PRODUCT BUNDLE AND RELATED METHODS

(71) Applicant: Inmar Clearing, Inc., Winston-Salem, NC (US)

(72) Inventors: Diana Medina, Winston-Salem, NC (US); Alise Raak, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/238,462

(22) Filed: Apr. 23, 2021

(51) Int. Cl.
*G06Q 30/02* (2023.01)
*G06N 20/00* (2019.01)
*G06Q 20/20* (2012.01)
*G06Q 30/0207* (2023.01)
*G06V 20/10* (2022.01)
*G06V 20/68* (2022.01)

(52) U.S. Cl.
CPC ......... *G06Q 30/0222* (2013.01); *G06N 20/00* (2019.01); *G06Q 20/20* (2013.01); *G06Q 30/0224* (2013.01); *G06V 20/10* (2022.01); *G06V 20/68* (2022.01)

(58) Field of Classification Search
CPC ....................... G06Q 30/0222; G06Q 30/0224
USPC .......................................... 705/14.23, 14.25
See application file for complete search history.

(56) References Cited

U.S. PATENT DOCUMENTS

| | | | |
|---|---|---|---|
| 2001/0034658 A1* | 10/2001 | Silva | G06Q 30/0633 705/26.8 |
| 2005/0021400 A1* | 1/2005 | Postrel | G06Q 20/3574 705/14.27 |
| 2014/0143020 A1 | 5/2014 | Wolfe et al. | |
| 2014/0214547 A1* | 7/2014 | Signorelli | G06Q 30/0267 705/14.64 |

(Continued)

OTHER PUBLICATIONS

Emily, Product Bundling: A Cooking Recipe to Make Unrefusable Meals for Your Customers, Beeketing, downloaded Jan. 12, 2022, dated Jan. 25, 2021, from https://web.archive.org/web/20210125064551/https://beeketing.com/blog/product-bundling/ (Year: 2021).*

(Continued)

*Primary Examiner* — Scott D Gartland
(74) *Attorney, Agent, or Firm* — ALLEN, DYER, DOPPELT, + GILCHRIST, P.A.

(57) ABSTRACT

A system for a product bundle may include a user device for acquiring an image including stocked food products, and a bundle server configured to obtain the image from the user device. The bundle server may identify each of the stocked food products using image recognition, and associate at least one of the identified stocked food products with a recipe. The recipe may include needed food products. The bundle server may generate a product bundle for purchase that includes the needed food products. The product bundle may have a bundle price less than a sum of individual purchase prices of each of the needed food products. The bundle server may also communicate the product bundle for purchase and the bundle price to the user device, and generate a digital promotion redeemable toward the purchase of the product bundle and communicate the digital promotion to the user device.

25 Claims, 8 Drawing Sheets

(56) References Cited

U.S. PATENT DOCUMENTS

| | | | | |
|---|---|---|---|---|
| 2015/0379601 | A1* | 12/2015 | Ouimet | G06Q 30/0613 |
| | | | | 705/26.41 |
| 2016/0021116 | A1* | 1/2016 | Maguire | H04L 63/08 |
| | | | | 726/4 |
| 2019/0213443 | A1* | 7/2019 | Cunningham | G06F 18/214 |
| 2019/0340674 | A1* | 11/2019 | Vaananen | F25D 29/00 |
| 2020/0134695 | A1* | 4/2020 | Avlani | G06Q 30/0255 |
| 2021/0089943 | A1* | 3/2021 | Choi | G06N 20/00 |
| 2021/0090154 | A1* | 3/2021 | Michaelson | G06Q 30/0631 |
| 2021/0174426 | A1* | 6/2021 | Isaacson | G06Q 20/203 |
| 2021/0348828 | A1* | 11/2021 | Shin | F25D 29/006 |
| 2021/0383458 | A1* | 12/2021 | Crawford | G06Q 10/087 |
| 2022/0282910 | A1* | 9/2022 | Jeong | G06N 20/00 |

OTHER PUBLICATIONS

Grant, Ashley, Build a bundle package for your online store to increase sales, GoDaddy, dated Sep. 26, 2016, downloaded Jan. 12, 2022 from https://www.godaddy.com/garage/build-a-bundle-package-for-your-online-store-to-increase-sales/ (Year: 2016).*

Flowers, Jeff, 10 Apps to Help You Organize Your Fridge & Pantry, CompactAppliance.com, dated Jan. 28, 2015, downloaded Jul. 12, 2022 from https://learn.compactappliance.com/apps-for-your-fridge/ (Year: 2015).*

Happy Meal coupon, self-dated 2012, was downloaded Sep. 13, 2022 from http://www.popscreen.com/prod/MTU4ODc4MTly/-MCDONALDS-COUPONS-199-HAPPY-MEAL-MCDONALDS-COUPON-FREE-SHIPPING (Year: 2012).*

Universal Product Code, from Wikipedia, dated Apr. 12, 2021, retrieved from https://en.wikipedia.org/w/index.php?title=Universal_Product_Code&oldid=1017351557 on Jan. 17, 2023 (Year: 2021).*

Nosto, Dynamic Bundles, retrieved Jan. 17, 2023, from the WayBack Machine at web.archive.org [online] at https://web.archive.org/web/20200404044351/https://www.nosto.com/products/dynamic-bundles/, but dated Apr. 4, 2020 (Year: 2020).*

Samsung, New Food AI Looks Inside Your Fridge to Help You Find the Perfect Things to Cook With What You Already Have, Samsung.com [online], dated Jan. 7, 2020, downloaded Sep. 10, 2023 from https://news.samsung.com/us/new-food-ai-looks-inside-fridge-help-find-perfect-things-cook-already/ (Year: 2020).*

Thorbecke, Catherine, New tech suggests recipes based on the food already in your fridge, ABC News [online], dated Jan. 8, 2020, downloaded Sep. 10, 2020 from https://abcnews.go.com/Technology/tech-suggests-recipies-based-food-fridge/story?id=68152071 (Year: 2020).*

Kwon, Smart Refrigerator for Healthcare Using Food Image Classification, BCB '16: Proceedings of the 7th ACM International Conference on Bioinformatics, Computational Biology, and Health Informatics, Oct. 2016, pp. 483-484, https://doi.org/10.1145/2975167.2985644 downloaded Sep. 10, 2023 (Year: 2016).*

Biggs, John, Not hog dog? PixFood lets you shoot and identify food, TechCrunch.com [online], dated Sep. 10, 2018, downloaded Sep. 10, 2023 from https://techcrunch.com/2018/09/10/not-hog-dog-pixfood-lets-you-shoot-and-identify-food/ (Year: 2018).*

\* cited by examiner

SYSTEM FOR A PRODUCT BUNDLE INCLUDING DIGITAL PROMOTION REDEEMABLE TOWARD THE PRODUCT BUNDLE AND RELATED METHODS

TECHNICAL FIELD

The present invention relates to the field of electronics, and more particularly, to generating a product bundle based upon online browsing data and related methods.

BACKGROUND

Product bundling may be considered the offering of several products or services for sale as one combined product or service package. For example, a shopper may purchase a product bundle that includes several products that may be purchased individually. One example of a product bundle may be with respect to fast food, whereby a customer may purchase a "meal" instead of the items in the meal individually.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A system for a product bundle may include a user device for acquiring an image including a plurality of stocked food products. The system may also include a bundle server configured to obtain the image from the user device, and identify each of the plurality of stocked food products using image recognition. The bundle server may also be configured to associate at least one of the identified stocked food products with a recipe. The recipe may include a plurality of needed food products. The bundle server may be configured to generate a product bundle for purchase that includes the plurality of needed food products. The product bundle may have a bundle price less than a sum of individual purchase prices of each of the needed food products. The bundle server may also be configured to communicate the product bundle for purchase and the bundle price to the user device, and generate a digital promotion redeemable toward the purchase of the product bundle and communicate the digital promotion to the user device.

The bundle server may be configured to obtain historical shopping data for a given user and associate the at least one of the identified stocked food products with the recipe based upon the historical shopping data. The bundle server may be configured to obtain historical shopping data for a given user, and generate the product bundle for purchase based upon the historical shopping data, for example.

The bundle server may be configured to obtain historical shopping data from among a plurality of other users, and generate the product bundle for purchase based upon the historical shopping data from the plurality of other users. The bundle server may be configured to obtain historical shopping data and images of stocked food products from other users, and perform machine learning to generate the product bundle for purchase based upon the obtained images and historical shopping data from other users, for example.

The bundle server may be configured to obtain historical shopping data and images of stocked food products from other users to perform machine learning, and perform machine learning to associate the at least one of the identified stocked food products with the recipe based upon obtained images and historical shopping data from the other users, for example. The bundle server may be configured to permit purchase of the product bundle via an e-commerce platform associated with a given retailer, for example.

The bundle server may be configured to cooperate with a virtual shopping cart of an e-commerce platform of a given retailer to add the product bundle for purchase to the virtual shopping cart. The bundle server may be configured to use the image recognition techniques to match at least one of a shape, a color, and a package of each of the plurality of stocked food products to a product identifier, for example.

The system may further include a point-of-sale (POS) terminal. The bundle server may be configured to permit purchase of the product bundle at the POS terminal, for example.

A method aspect is directed to a method for a product bundle. The method may include using a bundle server to obtain an image from a user device for acquiring the image including a plurality of stocked food products, and identify each of the plurality of stocked food products using image recognition. The method may also include using the bundle server to associate at least one of the identified stocked food products with a recipe. The recipe may include a plurality of needed food products. The method may further include using the bundle server to generate a product bundle for purchase including the plurality of needed food products. The product bundle may have a bundle price less than a sum of individual purchase prices of each of the needed food products. The method may also include using the bundle server to communicate the product bundle for purchase and the bundle price to the user device, and generate a digital promotion redeemable toward the purchase of the product bundle and communicate the digital promotion to the user device.

A computer readable medium aspect is directed to a non-transitory computer readable medium for a product bundle that includes computer executable instructions that when executed by a processor cause the processor to perform operations. The operations may include obtaining an image from a user device for acquiring the image including a plurality of stocked food products, and identifying each of the plurality of stocked food products using image recognition. The operations may further include associating at least one of the identified stocked food products with a recipe. The recipe may include a plurality of needed food products. The operations may further include generating a product bundle for purchase including the plurality of needed food products. The product bundle may have a bundle price less than a sum of individual purchase prices of each of the needed food products. The operations may further include communicating the product bundle for purchase and the bundle price to the user device, generating a digital promotion redeemable toward the purchase of the product bundle, and communicating the digital promotion to the user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
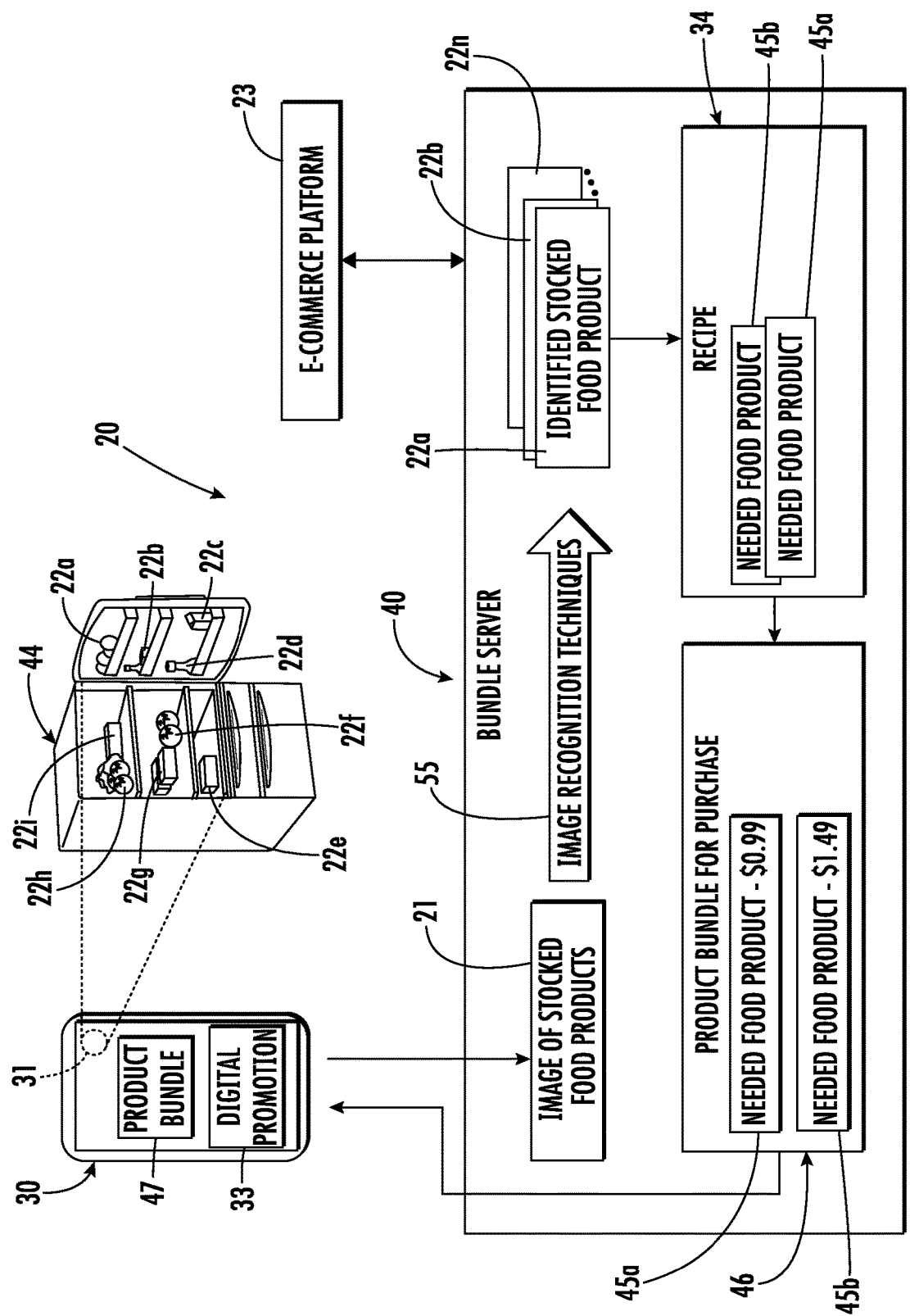
FIG. 1 is a schematic diagram of a system for a product bundle in accordance with an embodiment.
Figure 2:
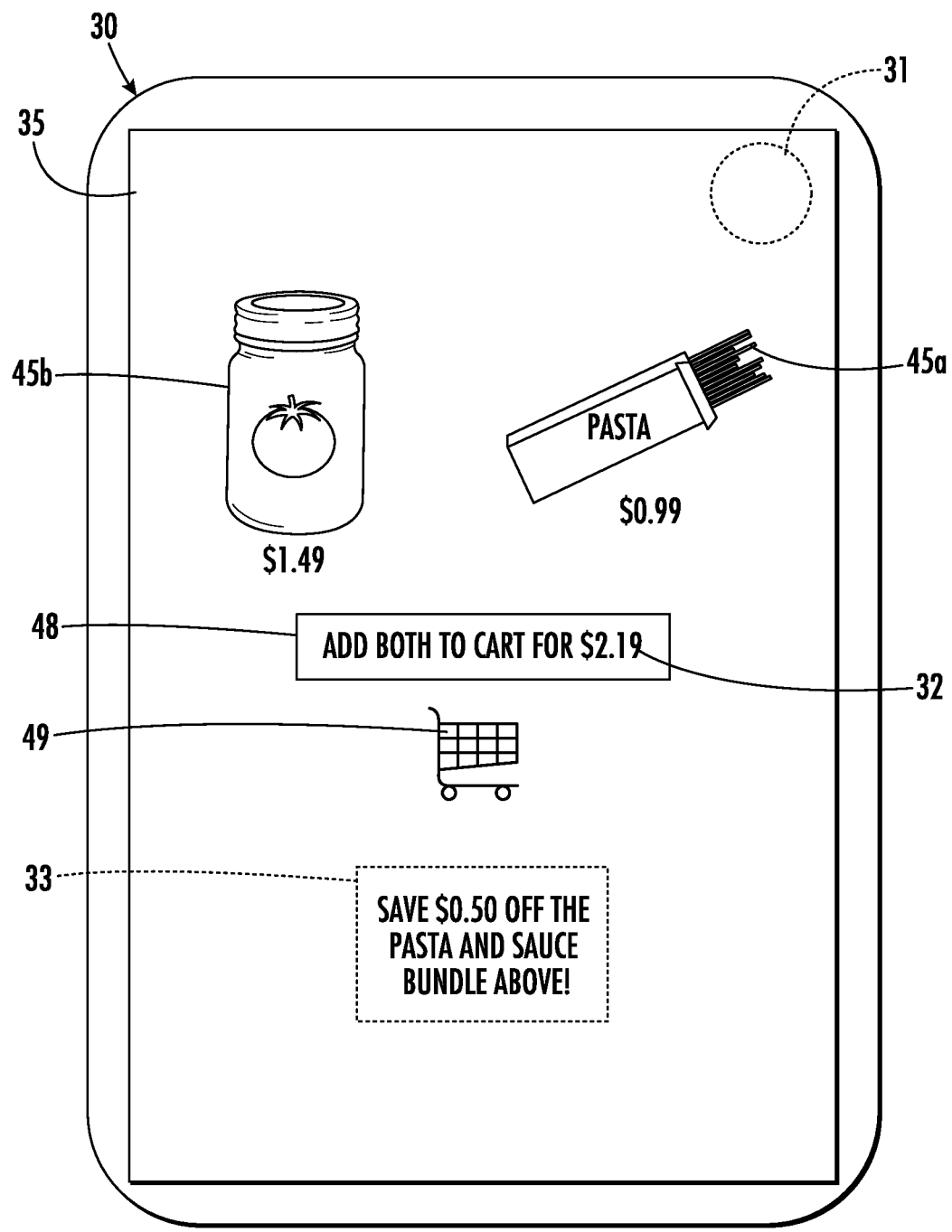
FIG. 2 is a schematic diagram of a user device of the system for a product bundle of FIG. 1.
Figure 3:
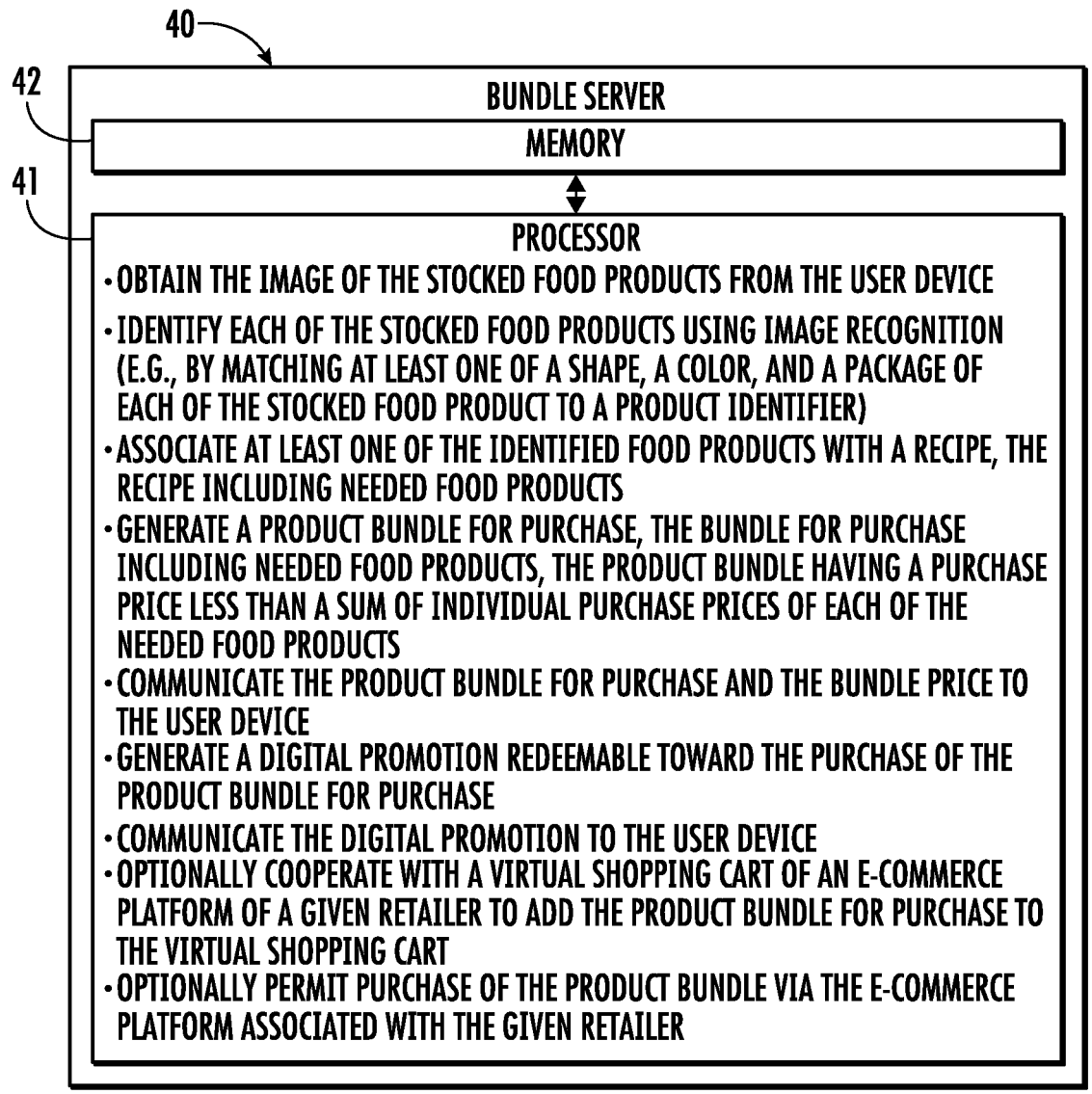
FIG. 3 is a schematic block diagram of a portion of the system for a product bundle of FIG. 1.

Referring initially to FIGS. 1-3, a system 20 for a product bundle for purchase includes a user device 30 associated with a given user. The user device 30 is illustratively in the form of a mobile wireless communications device, or more specifically a mobile phone. Of course, the user device 30 may be in the form of another type of device, for example, a tablet computer, desktop computer, laptop computer, or wearable device. In embodiments, the user device 30 may operate or execute an application, which may be associated with a retailer, for example, and may permit the given user to search for products and/or services within the application, and purchase selected products and/or services within the application.

The user device 30 acquires an image 21, for example, via the application, that includes stocked food products 22a-22n. The image 21 may be acquired from another device and communicated to the user device 30, for example. The user device 30 may include a camera 31 that may acquire the image of the stocked food products 22a-22n.

The stocked food products 22a-22n may be food products within a refrigerator, a freezer, a pantry, or other food storage location. The number of stocked food products 22a-22n in an acquired image may be based upon the field of the view or how the image is acquired. In other words, an image may be acquired to capture a given shelf in a refrigerator 44 or pantry, while not capturing other portions of the given shelf or refrigerator, for example. In contract, the image 21 may be acquired to capture the entire inside of a refrigerator 44, for example. The user device 30 may acquire multiple images 21, for example, which may be overlapping or have common stocked food products 22a-22n, or may be mutually exclusive such that there are no common stocked food products in multiple acquired images.

The system 20 also includes a bundle server 40. The bundle server includes a processor 41 and an associated memory 42. While operations of the bundle server 40 are described herein, those skilled in the art will appreciate that the operations are performed through cooperation between the processor 41 and the memory 42.

Figure 4:
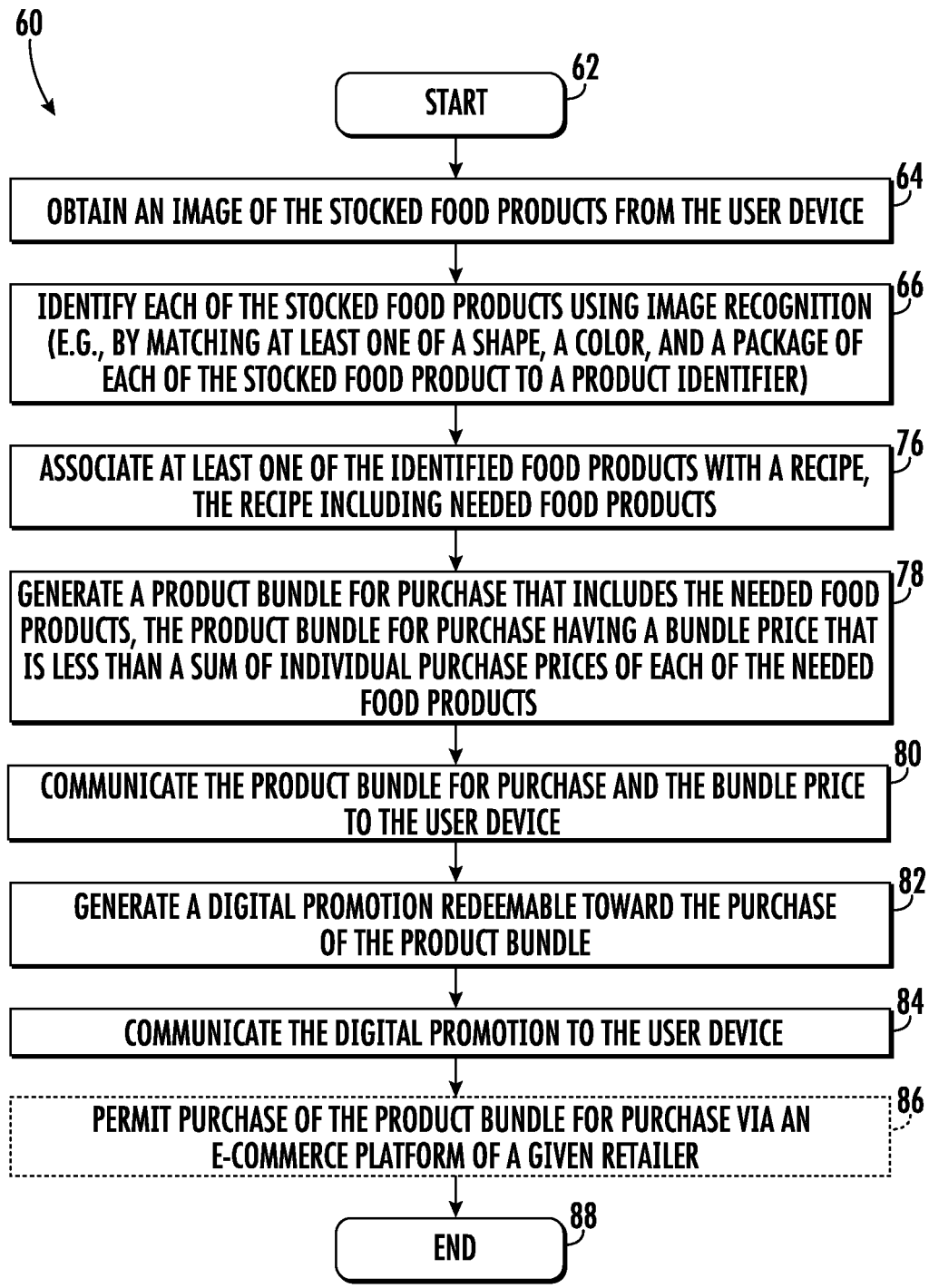
FIG. 4 is a flow diagram illustrating operation of the bundle server of the system for a product bundle of FIG. 1.

Referring now to the flowchart 60 in FIG. 4, beginning at Block 62, operations of the bundle server 40 will now be described. At Block 64, the bundle server 40 obtains an image 21 from the user device 30. Using image recognition techniques 55, the bundle server 40 identifies each of the stocked food products 22a-22n in the image 21 (Block 66). More particularly, the bundle server 40 may store product identifiers, for example, uniform product codes (UPCs) for food products. The bundle server 40 may identify a pattern in the image 21 that represents one or more product identifiers, for example, UPCs. Using optical character recognition, the bundle server 40 may identify product identifiers from the image 21 and identify the stocked food products 22a-22n based upon a comparison with the stored product identifiers.

The bundle server 40 may also use machine learning to match at least one of a shape, a color, and a package of each of the plurality of stocked food products 22a-22n to a product identifier, for example, stored in the memory 42. More particularly, the bundle server 40 may learn physical characteristics of any given food product, for example, the packaging size, shape, and color, a label size, shape, and color, wording sizing, shape, color, and placement, etc. from training data. Using machine learning, for example, the bundle server 40 may identify the stocked food products 22a-22n based upon the identified physical characteristics.

In some embodiments, the physical characteristics may be directly translated to a product description. The bundle server 40 may generate a corresponding matched product identifier, for example, based upon executing the machine learning algorithm, and, optionally, also based upon comparison to the stored product identifiers. The identification techniques described above may be applied without machine learning. In other words, the stocked food products 22a-22n may be identified as described above, but learning is not performed with each match or identification. Of course, other and/or additional methods or techniques may be used to identify the stocked food products 22a-22n.

The bundle server 40, at Block 76, associates at least one of the identified stocked food products 22a-22n with a recipe 34. More particularly, the bundle server 40 may determine a recipe 34 that includes one or more of the stocked food products 22a-22n. In an implementation example, the image 21 from the user device 30 may be of the inside of the user's refrigerator 44. The bundle server 40 may identify chicken and mushrooms as stocked food products 22a-22n. Thus, the bundle server 40 may identify a recipe 34 that includes chicken and mushrooms. The bundle server 40 may store a database of recipes and food products and ingredients corresponding to the recipe 34. The bundle server 40 may compare or look for matches, for example, a greatest number of matched food products, for selection or association with the recipe 34.

Other food products of the recipe 34 that are not identified as stocked are considered needed food products 45a, 45b. In other words, the needed food products 45a, 45b are food products that are part of the recipe 34, but not identified as stocked, or that are needed to complete the recipe. With respect to the above implementation example, the needed food products 45a, 45b may include pasta and pasta sauce for the corresponding recipe 34. The recipe 34 may be a recipe for a specific food product or for a meal or meal kit.

The bundle server 40 generates a product bundle for purchase 46 (Block 78). The bundle for purchase 47 includes the needed food products 45a, 45b. The product bundle for purchase 47 has a bundle purchase price that is less than a sum of individual purchase prices of each of the needed food products 45a, 45b. With respect to the exemplary implementation, where the needed items 45a, 45b of the recipe 34 are pasta and pasta sauce, the product bundle for purchase 47 may include the pasta and pasta sauce, which individually may have a purchase price of $0.99 and $1.49, respectively. The product bundle for purchase 47 that includes the pasta and the pasta sauce may thus have a bundle price 32 of $2.19.

The bundle server 40, once the product bundle for purchase 47 has been generated at Block 78, communicates the product bundle for purchase and the bundle price 32 to the user device 30 (Block 80). For example, where the user device 30 is in the form of mobile wireless communications device, the bundle server 40 may wirelessly communicate the product bundle for purchase 47 and the bundle price 32. In some embodiments, for example, where the user device 30 operates or executes an application associated with the retailer, the product bundle for purchase 47 and the bundle price 32 may appear within the application or as a notification on the user device.

At Block 82, the bundle server 40 generates a digital promotion 33 redeemable toward the purchase of the product bundle for purchase 47. The digital promotion 33 is illustratively in the form of a digital coupon. The digital promotion 33 may be in the form of a digital rebate, for example.

At Block 84, the digital promotion 33 is communicated to the user device 30. The digital promotion 33 may be saved to a digital wallet associated with the given user, for example, across multiple retailers or associated with a given retailer (e.g., within the retailer's loyalty program or application).

The bundle server 40, at Block 86, permits purchase of the product bundle for purchase 47, for example, via an e-commerce platform 23 associated with a given retailer, and applies the digital promotion 33 to the purchase of the product bundle via the e-commerce platform. In other words, the bundle server 40 permits the given user to make an in-app or online purchase of the product bundle for purchase 47 and apply the digital promotion 33. For example, the given user may provide input to an "add-to-cart" icon 48 displayed on the display 35 of the user device 30, which is turn adds the product bundle for purchase 45a, 45b to a virtual shopping cart 49 of the e-commerce platform 23. In embodiments, the e-commerce platform 23 may be operated by a third party payment processor and associated with the retailer. Operations end at Block 88.

Figure 5:
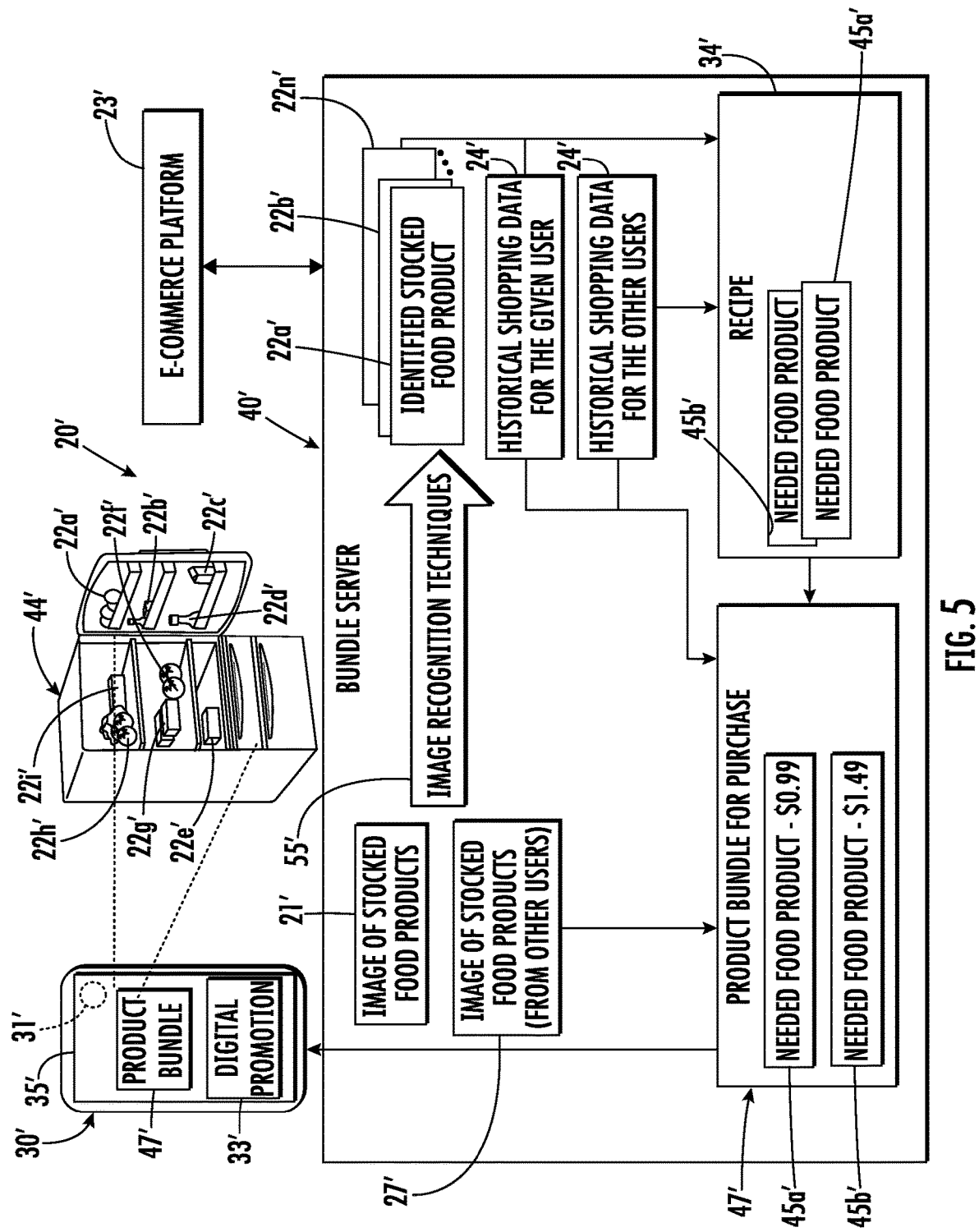
FIG. 5 is a schematic diagram of a system for a product bundle in accordance with another embodiment.
Figure 6:
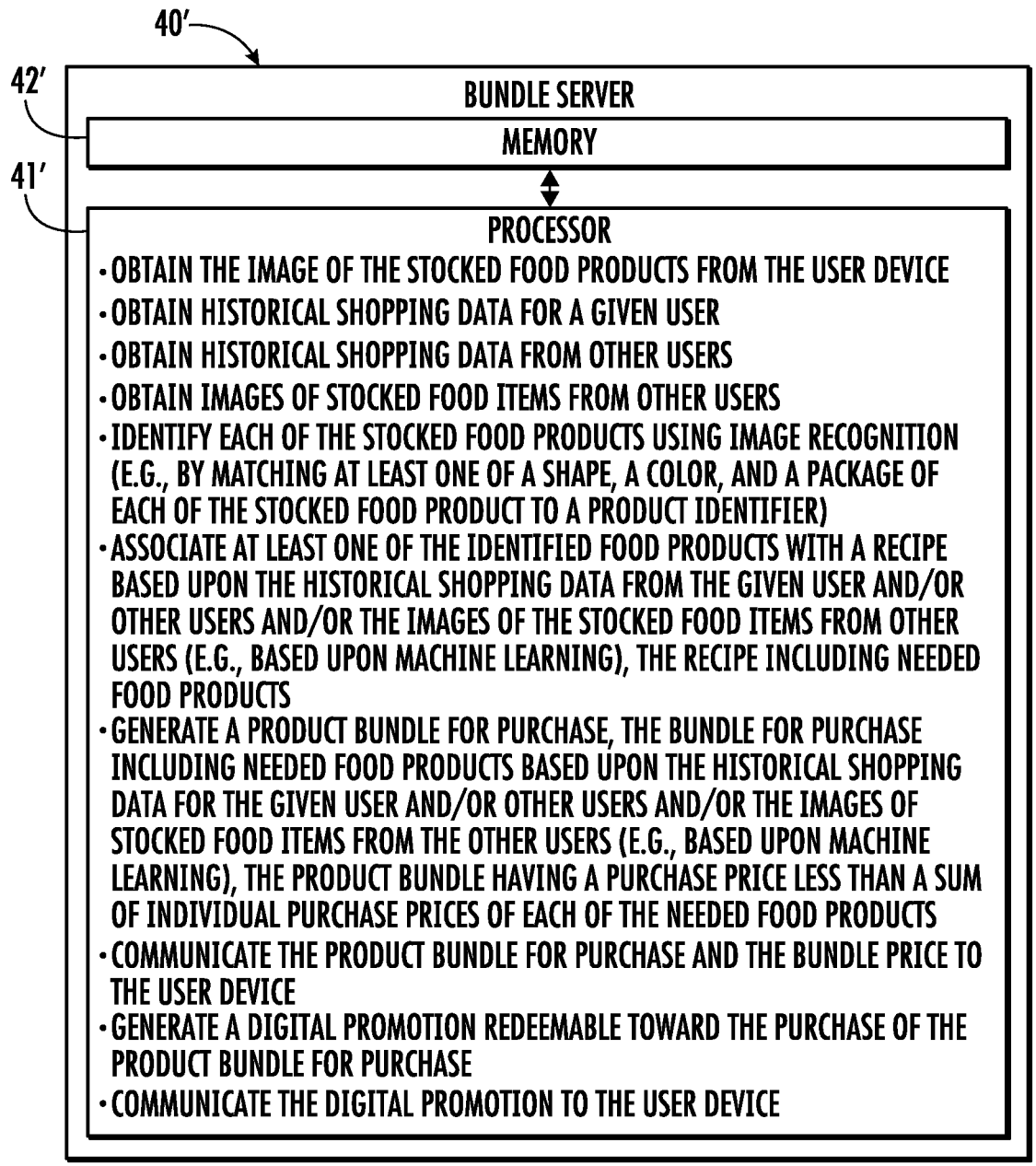
FIG. 6 is a schematic block diagram of a portion of the system for a product bundle of FIG. 5.
Figure 7:
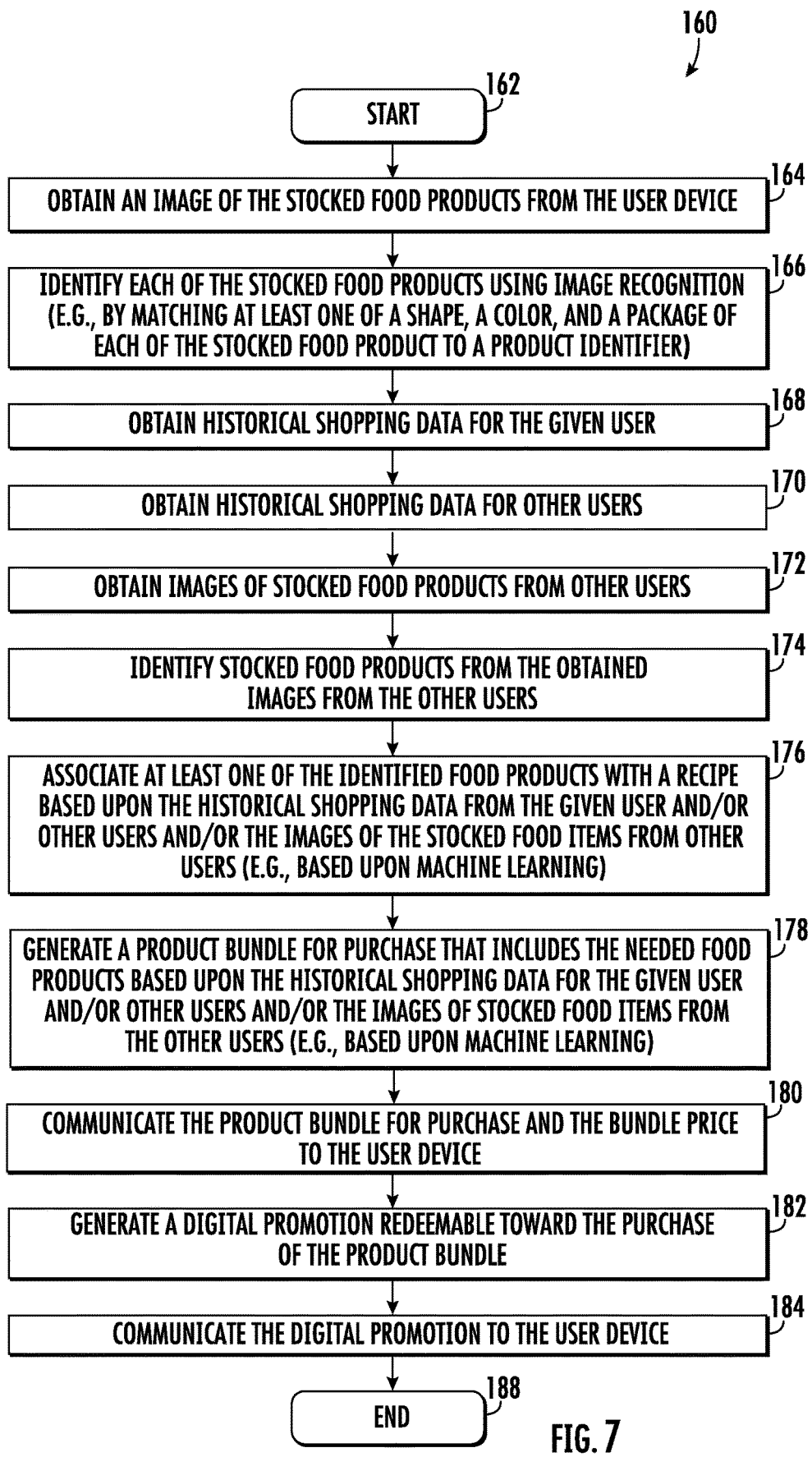
FIG. 7 is a flow diagram illustrating operation of the bundle server of the system for a product bundle of FIG. 5.

Referring now to FIGS. 5-6, and the flowchart 160 in FIG. 7, beginning at Block 162, in another embodiment, the bundle server 40' of the system 20' may associate the identified stocked food products 22a-22n' with the recipe 34' and generate the product bundle for purchase 47' based upon historical shopping data 24', and data form other users. Operations of obtaining the image 21' from the user device 30' (Block 164), and identifying each of the stocked food products 22a'-22n' using image recognition (Block 166) are similar to the obtaining and identifying operations described above.

At Block 168, the bundle server 40' obtains historical shopping data for the given user 24'. The bundle server 40' may cooperate with one or more servers or databases to obtain a product purchase history for the given user, which may include, for historical purchased products, a product description, a date of purchase, a price paid, and other items purchased during a same purchase transaction. For example, where a given retailer operates an e-commerce platform 23', the historical shopping data 24' may be obtained from the e-commerce platform associated with the given retailer.

In some embodiments, the given user may be associated with a loyalty program account for a given retailer. The bundle server 40' may thus obtain the historical shopping data 24' based upon the loyalty program account. More particularly, the promotional server 40' may cooperate with a loyalty application or otherwise obtain loyalty program account access information for the given user. The bundle server 40' may use the loyalty program account access information to access the loyalty program account, for example, from a remote computer administrating the loyalty program account. In some embodiments, the loyalty program account may be served or administrated by the bundle server 40'. The historical shopping data 24' obtained from the loyalty program account may, in addition to the data described above, include promotion usage (e.g., digital coupons clipped and/or redeemed). The bundle server 40' may obtain the historical shopping data 24' based upon corresponding loyalty program accounts for the given user at different retailers.

The given user may alternatively or additionally have a user identifier associated therewith. The user identifier may be a username, phone number, email address, or other identifier, for example, that may be used to access a retailer website, e-commerce platform 23', or an account associated with the given user. The user identifier may also be any type of tracking identifier for tracking historical shopping data, either online in an e-commerce environment and/or in-store. The bundle server 40' may obtain the historical shopping data 24' based upon the user identifier. The user identifier may be used as a basis for obtaining the historical shopping data 24'. The bundle server 40' may obtain the historical shopping data 24' based upon both the user identifier and loyalty program account. The bundle server 40' may obtain the historical shopping data 24' based upon other programs or identifiers associated with the given user, for example, payment card or bank account numbers.

At Block 170, the bundle server 40' obtains historical shopping data 24' for other users. The historical shopping data 24' may be obtained for the other user similarly to that described above with respect to the given user.

At Block 172, the bundle server 40' obtains images of stocked food products from other users 27' and identifies each of the stocked food products 22a'-22n' from each of the obtained images from the other users (Block 174). The bundle server 40' obtains the images from the other users 27' and identifies the stocked food products 22a'-22n' using technique similar to those described in the above embodiments.

The bundle server 40' may thus associate the identified stocked food products 22a'-22n' for the given user with the recipe 34' based upon the historical shopping data 24' from either or both of the user and other users and obtained images 27' from other users (Block 176). The bundle server 40' may thus also generate the product bundle for purchase 47' based upon the historical shopping data 24' from either or both of the user and other users and obtained images 27' from other users (Block 178).

Further details of the bundle server 40' associating the identified stocked food products 22a'-22n' for the given user with the recipe 34' based upon the historical shopping data 24' from either or both of the user and other users and images 27' from other users, and generating the product bundle for purchase 47' based upon the historical shopping data from either or both of the user and other users and images from other users will now be described.

The bundle server 40' may use machine learning as a basis for associating the stocked food products 22a'-22n' of a given user to the recipe 34'. More particularly, the bundle server 40' may use the obtained historical shopping data 24' of the given user and other users to learn the given user's purchase patterns. For example, the bundle server 40' may determine or learn food products that the given user typically purchases together, for example, in the same shopping trip or order. With respect to the exemplary implementation example, the bundle server 40' determines that the given user typically purchases pasta and pasta sauce when they purchase chicken. Thus, the bundle server 40' may learn that the given user typically eats pasta with chicken.

The bundle server 40' may also use the historical shopping data 24' and images of stocked food products 22a'-22n' from other users in a similar way so that the shopping and food selection habits of the other users can be learned to develop an affinities. In other words, affinity analysis is performed whereby the bundle server 40' learns that users that purchase and have certain food products that include the stocked and needed food products 22a'-22n', 45a', 45b' are similar to the given user such that the associated recipe 34' would be not random and likely a recipe that the given user would have interest and purchase the needed food products 45a', 45b' to complete.

The bundle server 40' may also use machine learning as a basis for generating the product bundle for purchase 47'. More particularly, the bundle server 40' may use the obtained historical shopping data 24' of the given user and other users to learn the given user's purchase patterns, similarly to the association of the identified food products 22a'-22n' of the given user to the recipe 34'. For example, the bundle server 40' may determine or learn food products that the given user typically purchases together, for example, in the same shopping trip or order. With respect to the exemplary implementation example, the bundle server 40' determines that the given user typically purchases pasta and pasta sauce when they purchase chicken. Thus, the bundle server 40' may learn that the given user typically eats pasta with chicken.

The bundle server 40' may also use the historical shopping data 24' and images of stocked food products 27' from other users in a similar way so that the shopping and food selection habits of the other users can be learned to develop an affinities with respect to what products the given user is likely to purchase together. In other words, affinity analysis is performed whereby the bundle server 40' learns that users that purchase and have certain food products that include the stocked and needed food products 22a'-22n', 45a', 45b' are similar to the given user such that the needed food products that make up the product bundle for purchase 47' are not random and likely to be a bundle that the given user would purchase.

The bundle server 40' communicates the product bundle for purchase 47' to the user device (Block 180), generates the digital promotion 33' (Block 182), and communicates the digital promotion to the user device 30' (Block 184) as described with respect to embodiments above. Operations end at Block 188.

Figure 8:
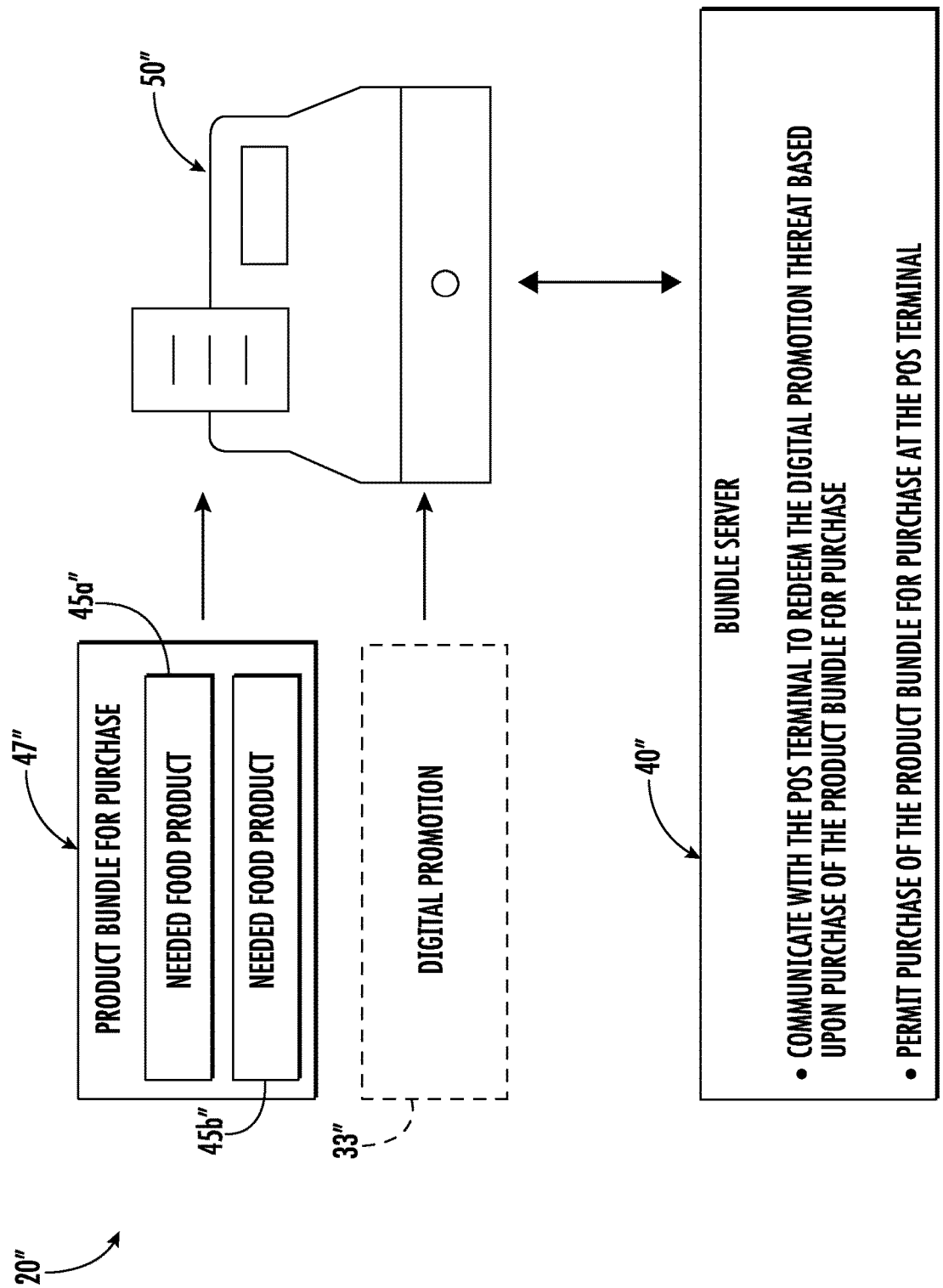
FIG. 8 is a schematic diagram of a system for a product bundle in accordance with another embodiment.

Referring now to FIG. 8, in another embodiment, the system 20" includes a point-of-sale (POS) terminal 50". The POS terminal 50" may be associated with a given retailer and may be at the given retailer. The POS terminal 50" processes a purchase of the product bundle for purchase 47" including the needed food products 25a", 25b". The bundle server 40" communicates with the POS terminal 50" to redeem the digital promotion 33" thereat based upon the purchase of the product bundle for purchase 47" at the POS terminal. In other words, the product bundle for purchase 47" is purchased at a physical store, as opposed to an e-commerce platform 23, as described above, and the digital promotion 33" is redeemed also at the physical store. The bundle server 40" may, in some embodiments, permit purchase of the product bundle for purchase 47" either via the e-commerce platform 23 or via a POS terminal 50" at a physical location, which may be particularly useful if a given retail operates both an e-commerce platform and a physical store. Elements illustrated, but not specifically described, such as, for example, are similar to those described above.

While the embodiments have been described with respect to food products, in some embodiments, the obtained image may be of stocked non-food products, and thus the generated bundle may include non-food products. For example, the stocked non-food products may include craft products (e.g., crayons), the recipe may be a craft to make candles, and the product bundle may include items jars, wicks, etc. Moreover, while operations have been described herein in a particular order, it should be understood that the operations may be performed in any order, serially, or in parallel. Moreover, some operations may be omitted, for example, the bundle server 40' may not obtain historical shopping data 24' and/or images from other users 27'.

A method aspect is directed to a method for a product bundle. The method includes using a bundle server 40 to obtain an image 21 from a user device 30 for acquiring the image including a plurality of stocked food products 22a-22n, and identify each of the plurality of stocked food products using image recognition. The method also includes using the bundle server 40 to associate at least one of the identified stocked food products 22a-22n with a recipe 34. The recipe 34 includes a plurality of needed food products 45a, 45b. The method further includes using the bundle server 40 to generate a product bundle for purchase 47 including the plurality of needed food products 45a, 45b. The product bundle 47 has a bundle price 32 less than a sum of individual purchase prices of each of the needed food products 45a, 45b. The method also includes using the bundle server 40 to communicate the product bundle for purchase 47 and the bundle price 32 to the user device 30, and generate a digital promotion 33 redeemable toward the purchase of the product bundle and communicate the digital promotion to the user device.

A computer readable medium aspect is directed to a non-transitory computer readable medium for a product bundle that includes computer executable instructions that when executed by a processor 41 cause the processor to perform operations. The operations include obtaining an image 21 from a user device for acquiring the image including a plurality of stocked food products 22a-22n, and identifying each of the plurality of stocked food products using image recognition. The operations further include associating at least one of the identified stocked food products 22a-22n with a recipe 34. The recipe 34 includes a plurality of needed food products 45a, 45b. The operations may further include generating a product bundle for purchase 47 including the plurality of needed food products 45a, 45b. The product bundle 47 has a bundle price 32 less than a sum of individual purchase prices of each of the needed food products 45a, 45b. The operations further include communicating the product bundle for purchase 47 and the bundle price 32 to the user device 30, generating a digital promotion 33 redeemable toward the purchase of the product bundle, and communicating the digital promotion to the user device.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for a product bundle comprising:
a user device associated with a given user for acquiring an image, the given user associated with a loyalty account, the image including a plurality of stocked food products from at least one post-purchase food storage location associated with the given user; and
a bundle server configured to
obtain the image from the user device,
identify each of the plurality of stocked food products using image recognition,
access the loyalty account of the given user to obtain historical shopping data for the given user,
obtain images of stocked food products and historical shopping data for at least one other user,
determine a recipe comprising a plurality of recipe food products including a plurality of needed food products to complete the recipe and also including at least one of the identified stocked food products, the recipe being determined based upon
1) a number of matching recipe food products to the plurality of identified stocked food products,
2) operation of a machine learning algorithm that learns purchase patterns of the given user from the historical shopping data for the given user, and
3) the images and historical shopping data for the at least one other user,
generate a product bundle for purchase comprising the plurality of needed food products to complete the recipe, the product bundle having a discounted bundle price less than a sum of individual purchase prices of each of the needed food products and without redemption of a digital coupon redeemable for an additional discount toward the purchase of the product bundle,
communicate the product bundle for purchase and the discounted bundle price to the user device, and
generate a digital coupon redeemable for an additional discount toward the purchase of the product bundle and having a redeemable value redeemable toward the discounted bundle price, and communicate the digital coupon to the user device.

2. The system of claim 1 wherein the bundle server is configured to generate the product bundle for purchase based upon the historical shopping data for the given user.

3. The system of claim 2 wherein the bundle server is further configured to generate the product bundle for purchase also based upon the historical shopping data for the at least one other user.

4. The system of claim 1 wherein the bundle server is configured to generate the product bundle for purchase based upon the obtained images and historical shopping data for the at least one other user.

5. The system of claim 1 wherein the bundle server is configured to permit purchase of the product bundle via an e-commerce platform associated with a given retailer.

6. The system of claim 1 wherein the bundle server is configured to cooperate with a virtual shopping cart of an e-commerce platform of a given retailer to add the product bundle for purchase to the virtual shopping cart.

7. The system of claim 1 wherein the bundle server is configured to use the image recognition techniques to match at least one of a shape, a color, and a package of each of the plurality of stocked food products to a product identifier.

8. The system of claim 1 further comprising a point-of-sale (POS) terminal; and wherein the bundle server is configured to permit purchase of the product bundle at the POS terminal.

9. The system of claim 1 wherein the historical shopping data for the given user comprises at least one of clipped digital promotion information and redeemed digital promotion information.

10. The system of claim 1 wherein the given user also has at least one further loyalty account associated therewith; and wherein the bundle server is further configured to also access the at least one further loyalty account of the given user to obtain the historical shopping data for the given user.

11. The system of claim 1 wherein the given user has a user identifier associated therewith; and wherein the bundle server is configured to access the loyalty account of the given user based upon the user identifier.

12. A bundle server for a product bundle comprising:
a processor and an associated memory configured to
obtain an image from a user device associated with a given user for acquiring the image, the given user associated with a loyalty account, the image including a plurality of stocked food products from at least one post-purchase food storage location associated with the given user,
identify each of the plurality of stocked food products using image recognition,
access the loyalty account of the given user to obtain historical shopping data for the given user,
obtain images and historical shopping data for at least one other user,
determine a recipe comprising a plurality of recipe food products including a plurality of needed food products to complete the recipe and also including at least one of the identified stocked food products, the recipe being determined based upon
1) a number of matching recipe food products to the plurality of identified stocked food products,
2) operation of a machine learning algorithm that learns purchase patterns of the given user from the historical shopping data for the given user, and
3) the images and historical shopping data for the at least one other user,
generate a product bundle for purchase comprising the plurality of needed food products to complete the recipe, the product bundle having a discounted bundle price less than a sum of individual purchase prices of each of the needed food products and without redemption of a digital coupon redeemable for an additional discount toward the purchase of the product bundle,
communicate the product bundle for purchase and the discounted bundle price to the user device, and
generate a digital coupon redeemable for an additional discount toward the purchase of the product bundle and having a redeemable value redeemable toward the discounted bundle price, and communicate the digital coupon to the user device.

13. The bundle server of claim 12 wherein the processor is configured to generate the product bundle for purchase based upon the historical shopping data for the given user.

14. The bundle server of claim 13 wherein the processor is further configured to generate the product bundle for purchase also based upon the historical shopping data for the at least one other user.

15. The bundle server of claim 12 wherein the processor is configured to perform machine learning to generate the product bundle for purchase based upon the obtained images and historical shopping data for the at least one other user.

16. The bundle server of claim 12 wherein the historical shopping data for the given user comprises at least one of clipped digital promotion information and redeemed digital promotion information.

17. The bundle server of claim 12 wherein the given user also has at least one further loyalty account associated therewith; and wherein the processor is further configured to also access the at least one further loyalty account of the given user to obtain the historical shopping data for the given user.

18. A method for a product bundle comprising:
using a bundle server to
obtain an image from a user device associated with a given user for acquiring the image, the given user associated with a loyalty account, the image including a plurality of stocked food products from at least one post-purchase food storage location associated with the given user,
identify each of the plurality of stocked food products using image recognition,
access the loyalty account of the given user to obtain historical shopping data for the given user,
obtain images and historical shopping data for at least one other user,
determine a recipe comprising a plurality of recipe food products including a plurality of needed food products to complete the recipe and also including at least one of the identified stocked food products, the recipe being determined based upon
1) a number of matching recipe food products to the plurality of identified stocked food products,
2) operation of a machine learning algorithm that learns purchase patterns of the given user from the historical shopping data for the given user, and 3) the images and historical shopping data for the at least one other user,
generate a product bundle for purchase comprising the plurality of needed food products to complete the recipe, the product bundle having a discounted bundle price less than a sum of individual purchase prices of each of the needed food products and without redemption of a digital coupon redeemable for an additional discount toward the purchase of the product bundle,
communicate the product bundle for purchase and the discounted bundle price to the user device, and
generate a digital coupon redeemable for an additional discount toward the purchase of the product bundle and having a redeemable value redeemable toward the discounted bundle price, and communicate the digital coupon to the user device.

19. The method of claim 18 wherein using the bundle server comprises using the bundle server to generate the product bundle for purchase based upon the historical shopping data for the given user.

20. The method of claim 18 wherein using the bundle server comprises using the bundle server to perform machine learning to generate the product bundle for purchase based upon the obtained images and historical shopping data from other users.

21. The method of claim 18 wherein the given user also has at least one further loyalty account associated therewith; and wherein using the bundle server further comprises using the bundle server to also access the at least one further loyalty account of the given user to obtain the historical shopping data for the given user.

22. A non-transitory computer readable medium for a product bundle comprising computer executable instructions that when executed by a processor cause the processor to perform operations comprising:
obtaining an image from a user device associated with a given user for acquiring the image, the given user associated with a loyalty account, the image including a plurality of stocked food products from at least one post-purchase food storage location associated with the given user;
identifying each of the plurality of stocked food products using image recognition;
accessing the loyalty account of the given user to obtain historical shopping data for the given user;
obtaining images and historical shopping data for at least one other user;
determining a recipe comprising a plurality of recipe food products including a plurality of needed food products to complete the recipe and also including at least one of the identified stocked food products, the recipe being determined based upon
1) a number of matching recipe food products to the plurality of identified stocked food products,
2) operation of a machine learning algorithm that learns purchase patterns of the given user from the historical shopping data for the given user, and
3) the images and historical shopping data for the at least one other user;
generating a product bundle for purchase comprising the plurality of needed food products to complete the recipe, the product bundle having a discounted bundle price less than a sum of individual purchase prices of each of the needed food products and without redemption of a digital coupon redeemable for an additional discount toward the purchase of the product bundle;
communicating the product bundle for purchase and the discounted bundle price to the user device; and
generating a digital coupon redeemable for an additional discount toward the purchase of the product bundle and having a redeemable value redeemable toward the discounted bundle price, and communicating the digital coupon to the user device.

23. The non-transitory computer readable medium of claim 22 wherein the operations comprise generating the product bundle for purchase based upon the historical shopping data for the given user.

24. The non-transitory computer readable medium of claim 22 wherein the operations comprise performing machine learning to generate the product bundle for purchase based upon the obtained images and historical shopping data for the at least one other user.

25. The non-transitory computer readable medium of claim 22 wherein the given user also has at least one further loyalty account associated therewith; and wherein the operations further comprise also accessing the at least one further loyalty account of the given user to obtain the historical shopping data for the given user.

* * * * *